United States Patent

[11] 3,617,840

[72] Inventor  Jalal T. Salihi
              4718 Pickering Road, Birmingham, Mich. 48010
[21] Appl. No. 93,276
[22] Filed     Nov. 27, 1970
[45] Patented  Nov. 2, 1971

[54] SYNCHRONIZED INVERTER AND PULSE MODULATOR
     2 Claims, 5 Drawing Figs.
[52] U.S. Cl. .................................................. 318/227,
                                    318/230, 318/231, 318/341
[51] Int. Cl. .................................................. H02p 5/40
[50] Field of Search .......................................... 318/227,
                                                 230, 231, 341

[56]         References Cited
         UNITED STATES PATENTS
3,512,067  5/1970   Landau .................... 318/227
3,529,223  9/1970   Vergez, Jr. ................ 318/227
3,546,551 12/1970   Risberg et al. ............. 318/227

Primary Examiner—Gene Z. Rubinson
Attorneys—E. W. Christen and C. R. Meland

ABSTRACT: A synchronized controlled rectifier inverter and controlled rectifier pulse modulator system providing an AC output voltage when supplied a direct voltage input. The pulse modulator is connected between the inverter and a source of direct voltage to regulate the DC level supplied the inverter. In operation, controlled rectifiers in the pulse modulator are gated in synchronism with the gating of controlled rectifiers in the inverter. This synchronization is effected by an oscillator angle control and differentiator circuit which develops the necessary trigger signals.

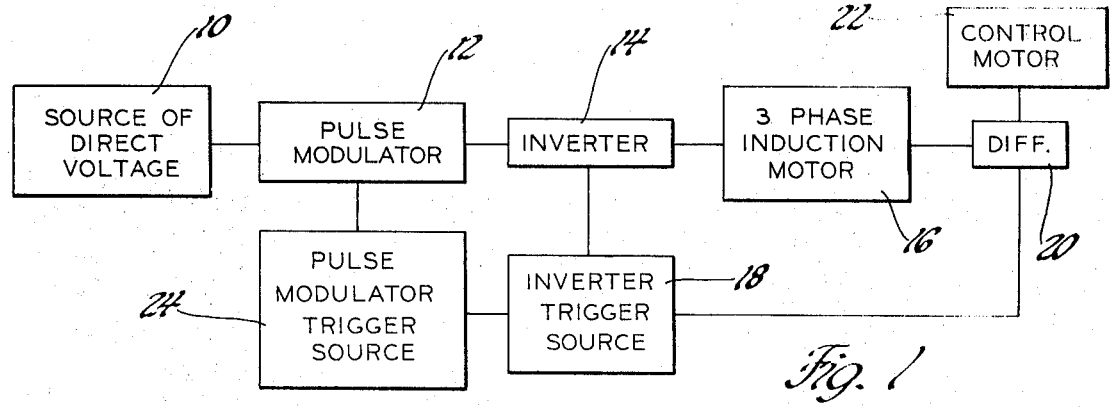
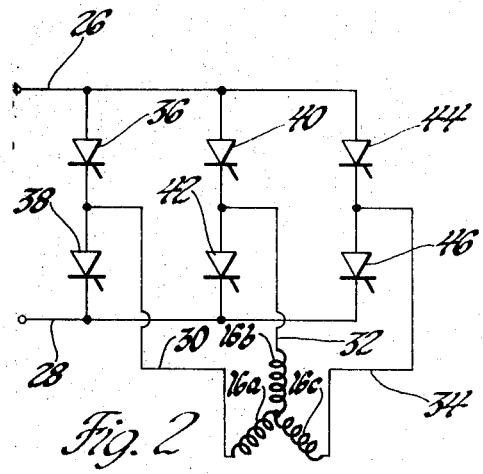
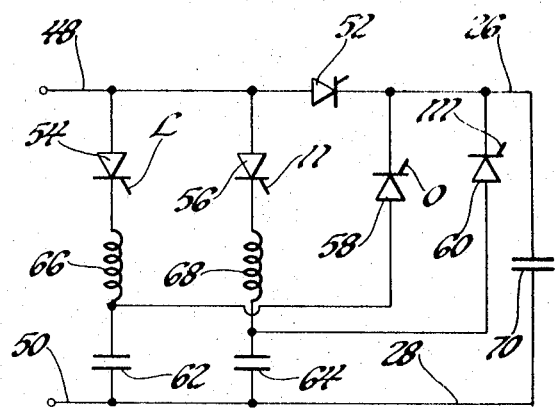
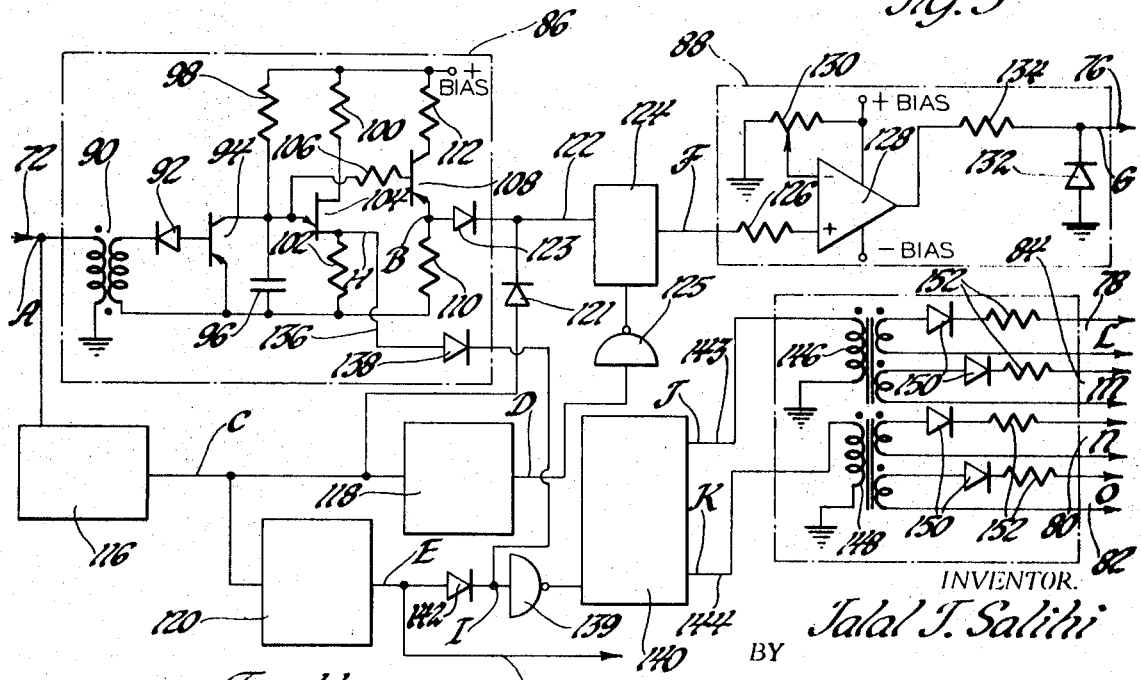

SYNCHRONIZED INVERTER AND PULSE MODULATOR

This invention relates to an electrical power supply system wherein a source of direct voltage is connected through a pulse modulator with an inverter to generate an alternating voltage at the inverter output and wherein the switching of controlled rectifiers in the inverter and in the pulse modulator is synchronized.

Inverter motor power supply systems providing controlled frequency alternating voltage to induction motor windings are generally known wherein a modulator is used to regulate the direct voltage input to the inverter. The U.S. Pat. to Salihi No. 3,392,316 assigned to the assignee of this invention discloses a modulator inverter arrangement of this general type. In these known motor supply systems, both the modulator and the inverter include controlled rectifiers as switching devices, and two independent trigger circuit arrangements are provided to effect gating of the controlled rectifiers in their respective modulator and inverter circuits. The resultant triggering of the inverter and the pulse modulator controlled rectifiers is not synchronized in operation.

In contrast with these known pulse modulator and inverter supply systems, the instant proposal contemplates synchronizing the inverter gate signals and the pulse modulator gate signals. This synchronization is accomplished by sensing the application of trigger signals to the inverter and controlling the trigger signals to the pulse modulator in accordance therewith. In this manner, the pulse modulator has a controlled duty cycle permitting control of the DC level input to the inverter, and its conductive sequence is identical for each time interval of inverter operation.

As a result of the synchronized switching of the instant system, modulation and beating between pulse modulator and inverter switching frequencies is eliminated. Accordingly, the amount of filtering necessary at the output of the pulse modulator is reduced, and a smaller filter capacitor can be used. Additionally, a balanced current is delivered to the three-phase motor load when the pulse modulator and inverter are switched in synchronism, thus improving the operation of the inverter motor supply system.

Accordingly, it is an object of the present invention to provide a motor control system wherein a source of direct voltage is connected through a pulse modulator with an inverter to supply AC voltage to a motor load and wherein the frequency of the alternating voltage can be controlled by the inverter and wherein the amplitude of the alternating voltage can be controlled by the pulse modulator and wherein operation of the inverter and the pulse modulator is synchronized by synchronizing the gate signals applied to the inverter and to the pulse modulator.

Another object of the present invention is to provide a motor control system wherein a source of direct voltage supplies power to an inverter through a pulse modulator and wherein gating signals to the inverter are sensed to control the gating signals applied to the pulse modulator such that the pulse modulator's operation is identical for each operating interval of the inverter thus being synchronized with the inerter's operation.

Additional objects and advantages of the present invention will be apparent from the following description wherein the figures listed below are incorporated as illustrating the preferred embodiment of the present invention.

In the drawings:

FIG. 1 is a block diagram schematic of the synchronized pulse modulator and inverter motor supply system of this invention.

FIG. 2 is a basic schematic of an inverter of the type shown in FIG. 1 including the power-controlled rectifiers of the inverter.

FIG. 3 is a basic schematic of a pulse modulator of the type shown in FIG. 1.

FIG. 4 is a circuit schematic of the synchronization circuitry required to synchronize the gating signals of the inverter and the pulse modulator of FIG. 1.

Figure 5:
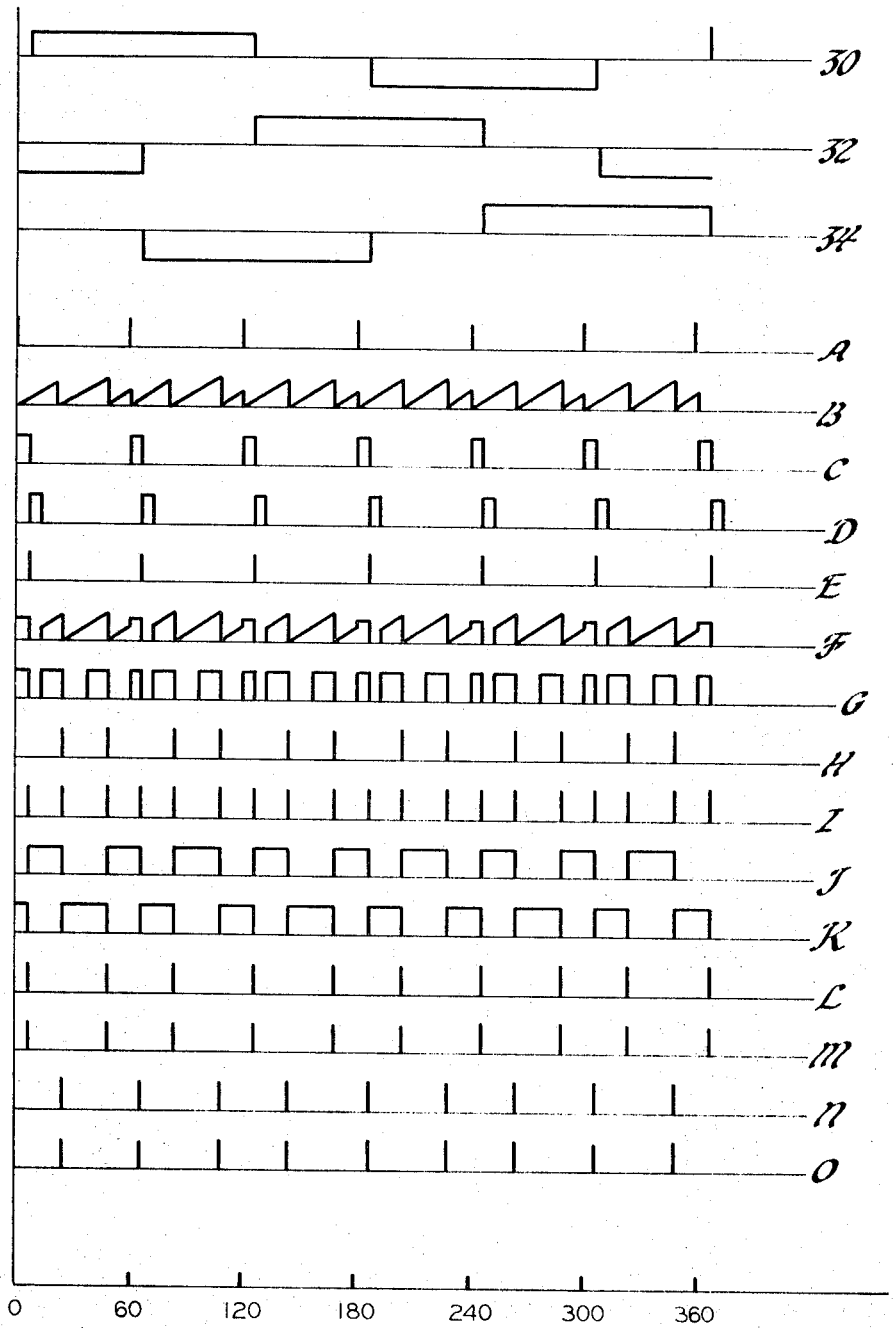
FIG. 5 is a graphical summary of the motor supply system operation including the control sequences for both the inverter and the pulse modulator.

Reference should now be made to FIG. 1 wherein a motor supply system is shown including a source of direct voltage 10 connected through a pulse modulator 12 with an inverter 14 to power a three-phase AC induction motor 16. This motor supply system includes slip frequency control 1 of the type generally disclosed in U.S. Pat. No. 3,323,032 Agarwal, assigned to the assignee of this invention. According to this control, the frequency of the voltage connected to the motor 16 by the inverter 14 is dependent on the frequency of gating signals connected to the control rectifiers of the inverter 14 by the inverter trigger source 18, and controlled slip is effected, as seen in the drawing, since a differential 20 connected both with the motor output and a control motor 22 supplies trigger information to the inverter trigger source 18 to control the frequency of trigger signals in accordance with the sum of the control motor and induction motor speeds. This arrangement is more fully disclosed in the Agarwal patent cited above. It should be appreciated that the speed signal from the control motor coupled with the differential 20 determines the slip frequency of the motor 16 and thus affords operator control of the slip frequency. The pulse modulator trigger source 24 provides gate signals to controlled rectifiers in the pulse modulator 12 to determine the duty cycle of the pulse modulator which in turn determines the direct voltage supplied to the inverter 14. These trigger signals are synchronized with the inverter trigger source by the connection shown in the drawing in a manner more fully described below.

In FIG. 2, a basic schematic of the inverter 14 is shown including input conductors 26 and 28 and output conductors 30, 32 and 34 connected with the phase windings 16a, 16b and 16c of the induction motor 16. The input conductors 26 and 28 are connected with the DC voltage supplied from the pulse modulator 12 of FIG. 1. The three output conductors 30, 32 and 34 supply three-phase AC voltage to the phase windings to power the induction motor 16.

The six controlled rectifiers 36, 38, 40, 42, 44 and 46 control the connection of voltage to the motor windings 16a, 16b and 16c and, accordingly, these controlled rectifiers control the frequency of the AC voltage available from the inverter 14. These six controlled rectifiers 36 through 46 are the inverter's power controlled rectifiers and they are supplied gate signals to their gate-cathode control circuits by the inverter trigger source 18 to render them periodically conductive. Since these power controlled rectifiers 36 through 46 are supplied direct voltage on the input conductors 26 and 28, it is necessary to provide auxiliary commutation to terminate each conductive interval of each controlled rectifier. The circuitry for the required commutation is not shown in the drawings, but it should be appreciated that a variety of commuting arrangements known in the art could be included to provide the requisite commutation. An example of a commuting circuit of the type required is that disclosed in copending application Ser. No. 42,336, Richard W. Johnston filed June 1, 1970, and entitled "Programmed Commuting Power Source for Inverter Motor System."

The inverter operation and the resultant motor energization sequence is summarized in the graphs of FIG. 5. The three graphs designated 30, 32 and 34 depict the voltages on the respective conductors of FIG. 2 having the same designations. From these graphs, it is seen that each of the three output conductors provides alternate positive and negative voltage pulses of 120 electrical degrees duration. These pulses are separated by 60 electrical degree intervals of zero output voltage. Considering conductor 30, it should be appreciated that the positive voltage pulse is provided by a 120 degree conductive interval of controlled rectifier 36 whereas the negative voltage pulse is provided during a 120° conductive interval of controlled rectifier 38. During the zero voltage intervals, both controlled rectifiers 36 and 38 are nonconductive. Similarly, controlled rectifiers 40 and 44 provide positive voltage pulses on conductors 32 and 34, while controlled rectifiers 42 and 46 cause negative voltage pulses on these two conductors. It should be appreciated that the motor windings 16a, 16b and 16c connected with the three output conductors 30, 32 and 34 of the inverter are supplied three-phase alternating voltage in accordance with this graphical summary of FIG. 5. This voltage has a frequency determined by the sequential gating of the controlled rectifiers 36 to 46 set by the frequency of gate signals provided by the trigger source 18 of FIG. 1.

FIG. 3 is a basic schematic for the pulse modulator 12 of FIG. 1. This pulse modulator has output conductors 26 and 28 which are the same conductors shown providing the input to the inverter of FIG. 2. Input conductors 48 and 50 connect the pulse modulator with the source of direct voltage 10. The source of direct voltage is not illustrated nor described in detail. It should be understood that various voltage sources known in the art can be used to supply the required DC input. For example, a bridge rectified AC voltage with appropriate filtering could be connected with the conductors 48 and 50 to supply DC voltage to the pulse modulator. As shown in the drawing, the pulse modulator includes a controlled rectifier 52 interposed directly between the input and output of the pulse modulator such that the output DC level is regulated by controlling the duty cycle of this controlled rectifier 52. Four shutoff or frequency-modulating controlled rectifiers 54, 56, 58 and 60, two capacitors 62 and 64 and two inductors 66 and 68 comprise commuting circuitry to provide commutation of the controlled rectifier 52. The operation of this pulse modulator including other circuit components normally included for improved performance is completely disclosed in U.S. Pat. No. 3,392,316 Salihi, assigned to the assignee of this invention. In the synchronized inverter and pulse modulator system of the instant invention, the pulse modulator is operated in the pulse width control mode discussed in the Salihi patent such that the controlled rectifier 52 has a variable duty cycle to regulate the direct voltage across the filter capacitor 70, as noted above. In this mode of operation, controlled rectifiers 54, 56, 58 and 60 provide shutoff control to terminate the conductive intervals of controlled rectifier 52 in a manner more completely described below in conjunction with the graphs of FIG. 5.

Reference should now be made to FIG. 4 wherein a circuit schematic of the synchronization system of this invention is shown in detail. In this synchronization circuit, input pulses having pulse widths on the order of 20 microseconds and shown as pulse train A in FIG. 5 are provided on conductor 72 from the output of the differential 20 of FIG. 1 at predetermined times to effect a desired trigger frequency for the controlled rectifiers of the inverter 14. This pulse train is processed by the circuitry of FIG. 4 to develop pulse modulator and inverter trigger signals. Control signals for regulating the application of trigger signals to the inverter 14 are provided on the conductor 74, and trigger signals synchronized with the inverter trigger signals are connected through conductor 76 to the gate-cathode control circuit of controlled rectifier 52 of the pulse modulator of FIG. 3. The four gate-cathode control circuits of the commuting controlled rectifiers 54, 56, 58 and 60 in FIG. 3 are connected with the trigger outputs 78, 84, 80 and 82, respectively. The six gate trigger signals required for the inverter controlled rectifiers 36 to 46 can be developed in the manner described in the Agarwal U.S. Pat. No. 3,323,032 from the pulses available on the conductor 74. The circuitry required and the development of these trigger signals are not illustrated in the drawings nor discussed in this description.

The processing of the pulse train A on conductor 72 includes generating a sawtooth voltage by means of an oscillator 86 and processing the sawtooth waveform to develop angle-controlled pulses on conductor 76 to gate the controlled rectifier 52 of the pulse modulator of FIG. 3. These angle-controlled pulses, developed by the comparator 88, are initiated at a predetermined angle of each cycle of the sawtooth waveform and last till the end of the cycle.

The pulse train A of FIG. 5 is applied to the input conductor 72 of FIG. 4, as noted above. These pulses are coupled through a transformer 90 and diode 92 to a transistor 94 connected across a capacitor 96. Thus, transistor 94 is rendered conductive on the occurrence of each trigger pulse of the pulse train A to discharge the capacitor 96. Intermediate each pair of trigger pulses in the train A, the capacitor 96 and a resistor 98 provide a charging or timing circuit for a unijunction transistor relaxation oscillator. This oscillator includes, in addition to the RC charging path, two resistors 100 and 102 and a unijunction transistor 104. The sawtooth waveform generated by this oscillator is connected through a resistor 106 with the base of a transistor 108 which provides an emitter follower output stage from the oscillator 86. The output voltage is taken across resistor 110 and resistor 112 connects the collector of the transistor 108 with the positive bias. The positive bias source is not illustrated, but it should be appreciated that known battery or bridge rectified DC voltage sources could be used for the bias supply.

Waveform B of FIG. 5 is available at the output of the emitter follower amplifier across the resistor 110. As shown in the graph, each trigger pulse in the pulse train A initiates a new oscillator sequence. This occurs as noted above as a result of the discharge of capacitor 96. Thus, the sawtooth oscillator commences oscillations anew after each of the pulses of the pulse train A and oscillations are terminated irrespective of the instantaneous point in the oscillation by the subsequent trigger pulse in the train A. The graph B shows approximately 2½ cycles for each 60° operating interval. This is arbitrary and a higher or lower frequency could be chosen according to the operating conditions desired.

The pulses of the train A are also applied to the monostable multivibrator 116. This multivibrator provides an output pulse on the rising edge of an input pulse. The pulse output from the multivibrator 116 is shown as pulse train C in FIG. 5. Each of the pulses in the train C follows immediately the initiation of a pulse A. The pulses in the train C can have any of a range of pulse widths, and, it is noted, 200 microseconds in a typical operating pulse width.

Pulses from the pulse train C are connected with monostable multivibrators 118 and 120 and through a diode 121 with a conductor 122. The monostable multivibrator 120 provides pulses on the falling edge of input pulses connected with it. These pulses are shown in FIG. 5 and are there labeled E, and, it is noted, these pulses are on the order of 20 microseconds. These pulses are connected, as noted above, by conductors 74 with a trigger arrangement (not illustrated) to generate gate signals for the controlled rectifiers of the inverter 14 and as seen in the graph of FIG. 5, the various conductive intervals of the controlled rectifiers of the inverter are initiated upon the application of the pulses of this pulse train E. Pulses comprising pulse train D of FIG. 5 are available at the output of monostable multivibrator 118 which generates an output pulse on the falling edge of each input pulse connected with it. These pulses have pulse widths typically on the order of 200 microseconds.

A diode 123 connects the sawtooth waveform B with the conductor 122. Thus, conductor 122 provides a composite of the waveforms B and C of FIG. 5. A discriminator 124 is enabled by a high-value signal from a NAND gate 125 to connect the conductor 122 with a resistor 126. A variety of known switching arrangements can be used for the discriminator 124, for example, a relay having its coil connected with the NAND gate 125 and a pair of normally open contacts connected between the conductor 122 and the resistor 126 would perform the required discrimination. The NAND gate 125 inverts the pulses of the train D such that the input to the discriminator 124 is at a high level when pulses in the train D are at a low level and the input to the discriminator 124 is at a low level only when pulses in the train D are at a high level. The output from the discriminator 124 is shown in FIG. 5 as waveform F.

Waveform F is applied through the resistor 126 to an operational amplifier 128. Operational amplifier 128 is of a conventional design and is not described in detail in this disclosure. This operational amplifier provides a positive output when the voltage connected with its positive input terminal is more positive than the voltage connected with its negative input terminal and a negative output at all other times.

The operational amplifier 128 is provided positive and negative bias voltage as shown in the drawing. The bias sources are not shown in detail, but it is noted that various known sources such as batteries or the output of a bridge rectified alternating current source could be used to supply the bias. The positive bias voltage is connected through a potentiometer 130 with the negative input terminal of the operational amplifier. Thus, the output of the operational amplifier on conductor 76 is negative during those time intervals in which the voltage at the negative input terminal from the potentiometer 130 is more positive than the voltage waveform F which is applied at the positive input terminal. In those times in which the voltage at the positive input terminal is more positive than the voltage at the negative input terminal, the output on conductor 76 is positive. A diode 132 and a resistor 134 provide a path to preclude conductor 76 from assuming a negative voltage. The resultant output from the operational amplifier 128 is the train G of FIG. 5, and these pulses are available on the conductor 76 to be applied to the controlled rectifier 52 of FIG. 3 to gate it conductive. It should be appreciated from the foregoing that a variable duty cycle for controlled rectifier 52 is available and control of this duty cycle is effected by adjusting the potentiometer 130. This permits more or less percentage conduction by the pulse modulator to regulate the voltage across the filter capacitor 70.

Each time the unijunction transistor 104 conducts, a pulse is produced across the resistor 102. The resultant pulse train H of FIG. 5 is connected through a conductor 136, a diode 138 and a NAND gate 139 to the input of a T flip-flop 140. A diode 142 connects the pulse train E with the NAND gate 139 for connection with the same input of this T flip-flop 140. Thus, the pulse train designated I, I being the composite of trains E and H, in FIG. 5 is connected at the input to the NAND gate 139. This NAND gate inverts the pulse train I and applies the inverted pulses to the T flip-flop 140. This flip-flop changes state on the rising edge of each input pulse applied to it. It has two output terminals; one is always at a high output value while the other is at a low output value. Thus, if the output on conductor 143 is at a high output value and the output on conductor 144 is at a low output value when a pulse is applied to the input, the output on conductor 143 will switch to the low output value and the output on conductor 144 will switch to the high output value. Each subsequent input pulse results in a similar change of state on the conductors 143 and 144. These outputs are shown as J and K in the drawing of FIG. 5. A typical commercially available T flip-flop is that from Fairchild Semiconductor having catalog designation U6A 9948 51X.

Differentiation of the pulses in waveforms J and K is preformed by transformers 146 and 148. The differentiated pulse outputs on trigger circuits 78, 80, 82 and 84 are shown in FIG. 5 as pulses L, M, N and O. The indices L, M, N and O are also shown in FIG. 3 to clarify the relationship of the trigger output to the controlled rectifiers 54 to 60. Thus, trigger pulses in train L are applied to controlled rectifier 54, train N is applied to controlled rectifier 56, train O is applied to controlled rectifier 58 and train M is applied to controlled rectifier 60. These pulses have pulse widths on the order of 20 microseconds, and they occur on the leading edges of the pulses in the pulse trains J and K. A diode 150 and a resistor 152 is included in each of the outputs to limit the current and constrain the output pulses to the positive pulses generated. The diodes block the negative pulses associated with the falling edges of the pulses in the pulse trains J and K.

In summary, the system of this invention provides synchronized pulses to an inverter and a pulse modulator used in a motor supply system to coordinate the switching of controlled rectifiers in both the inverter and the pulse modulator.

An analysis of FIG. 5 facilitates an understanding of the composite operation. At zero degrees, conductor 34 provides a positive voltage through conductive controlled rectifier 44 and conductor 32 provides a negative voltage through conductive controlled rectifier 42 to the motor windings 16b and 16c.

A pulse in pulse train A on conductor 72 appears at zero degrees resetting the relaxation oscillator 86 and initiating a new cycle for the waveform B. Pulse train C at the output of multivibrator 116 provides a pulse initiated by the leading edge of the pulse from pulse train A at 0°. At the termination of the pulse in pulse train C, a pulse is initiated in both pulse trains D and E at the respective outputs of multivibrators 118 and 120. The pulse of pulse train E causes the controlled rectifiers in the inverter to switch and accordingly controlled rectifier 44 is commuted terminating the voltage on conductor 34 while controlled rectifier 36 is gated conductive initiating a positive voltage pulse on conductor 30.

During the time increments in which the pulses of pulse train D are present, the controlled rectifier 52 is precluded from conducting since the pulse train D disables the discriminator 124 during its pulses. The pulses of pulse train C, on the other hand, provide a gate signal to the controlled rectifier 52 irrespective of the instantaneous value provided by the waveform B. The controlled rectifier is provided gate signals during those intervals in which pulses are shown in the pulse train G. Pulses are generated in the train G when the instantaneous voltage level of the waveform F exceeds the predetermined voltage level set by the potentiometer 130. The effect of the pulse trains C and D on the waveform B is shown in the waveform F. It is noted in this regard that the pulses of pulse train D cause gaps in the pulse train F, whereas the pulses of pulse train C provide a high-value signal in the waveform F.

Each time the unijunction transistor 104 conducts, a pulse is created in the pulse train H. Pulse train H is combined with pulse train E to provide the pulse train I, and each pulse in the pulse train I causes the flip-flop 140 to change its state. Accordingly, the pulse in pulse train E associated with the termination of the pulse train C initiated at 0° causes the flip-flop 140 to change stage, thus providing gating signals L and M to controlled rectifiers 54 and 60. These gating signals render these controlled rectifiers conductive such that capacitor 62 is charged through inductor 66 and controlled rectifier 54, and capacitor 64 is connected through controlled rectifier 60 across controlled rectifier 52 to bias it nonconductive.

Continuing the summary in conjunction with FIG. 5, it should be appreciated that at the end of the first cycle of the sawtooth output of the relaxation oscillator 86 shown in the waveform B, a pulse is produced in pulse trains H and I to cause flip-flop 140 to change state gating controlled rectifiers 56 and 58 conductive. In this manner, capacitor 64 is charged through controlled rectifier 56 and inductor 68 while the previously charged capacitor 62 is connected through controlled rectifier 58 to reverse bias the controlled rectifier 52 causing it to cease conduction. Similarly, at the conclusion of the second sawtooth cycle of the relaxation oscillator, a pulse in the pulse trains H and I is developed and controlled rectifiers 54 and 60 are gated conductive in response to the change of state by the flip-flop 140. At 60 electrical degrees, a second pulse in the pulse train A resets the relaxation oscillator as shown in the waveform B to initiate a repeat of the foregoing sequence of events. The succeeding 60° increment is identical to that described except that the inverter controlled rectifiers affected are different. This same process is duplicated in each 60° increment of operation of the synchronized pulse modulator and inverter supply system.

If the capacitor 70 of FIG. 3 is discharged intermediate-voltage pulses from the pulse modulator, the power-controlled rectifiers of the inverter will require continuous trigger signals for their respective 120° conductive interval to maintain them in the conductive mode. The U.S. Pat. No. 3,413,493 Corry, assigned to the assignee of this invention discloses a trigger arrangement suitable to supply continuous 120° trigger pulses to the inverter-controlled rectifier. Under this condition of operation wherein the capacitor 70 is completely discharged, the explanation set forth above would be modified to reflect the necessity of the 120° trigger signals and the pulsed character of the voltage supplied to the motor during each 120° interval.

Although this invention has been described with reference to a particular embodiment, it should be appreciated that various changes and modifications may be engrafted within the scope of the appended claims.

I claim:

1. A motor control system, comprising: a source of direct voltage, a controlled rectifier pulse modulator having an input and an output and including at least one controlled rectifier connected to transfer current between said input and output, means connecting the input of said pulse modulator with said source of direct voltage, a DC to AC controlled rectifier inverter, means connecting the input of said inverter with the output of said pulse modulator, an electric motor, means connecting said electric motor with the output of said inverter, a triggering means connected with the controlled rectifiers of said inverter for sequentially and periodically gating the controlled rectifiers conductive, a signal-generating means connected with said triggering means to initiate each application of a trigger signal to said inverter for controlling the output frequency of said inverter, an oscillator means connected with said signal generating means and controlled thereby to provide a periodic output initiated by a first pulse from said signal generating means and terminated by the subsequent pulse from said signal generating means, and a trigger pulse forming means connected with said oscillator means and with a controlled rectifier of said modulator to periodically gate that controlled rectifier conductive, said trigger pulse forming means including means for providing phase control of the application of said trigger pulses to said modulator within each cycle of the signal of said oscillator means to afford variable duty cycle operation of said modulator, said modulator providing a variable DC input voltage to said inverter according to the instantaneous duty cycle, said modulator being synchronized with said inverter in operation by the connection of said signal means with said triggering means whereby, the operation of said modulator at a predetermined output voltage level is substantially identical for each conductive interval of said inverter.

2. A motor control system, comprising: a source of direct voltage, a controlled rectifier pulse modulator having an input and an output and including at least one controlled rectifier connected to transfer current between said input and output, means connecting the input of said pulse modulator with said source of direct voltage, a DC to AC controlled rectifier inverter, means connecting the input of said inverter with the output of said pulse modulator, an electric motor, means connecting said electric motor with the output of said inverter, a triggering means connected with the controlled rectifiers of said inverter for sequentially and periodically gating the controlled rectifiers conductive, a pulse source, time delay means connecting said pulse source with said triggering means to initiate the application of a trigger signal to said inverter a predetermined time after each pulse from said pulse source, an oscillator means connected with said pulse source and controlled thereby to provide a periodic output initiated by a first pulse from said pulse source and terminated by the subsequent pulse from said pulse source, a trigger pulse forming means connected with said oscillator means and with a controlled rectifier of said modulator to periodically gate that controlled rectifier conductive, and an enabling means connected with said time delay means and said trigger pulse forming means to ensure that no gate signal is applied to said controlled rectifier of said modulator for a predetermined time interval subsequent to the application of a gate signal to the controlled rectifiers of said inverter, said trigger pulse forming means providing phase control of the application of said trigger pulses to said modulator within each cycle of the signal of said oscillator means to afford variable duty cycle operation of said modulator, said modulator providing a variable DC input voltage to said inverter according to the instantaneous duty cycle, said modulator being synchronized with said inverter in operation by the connection of said pulse source with said triggering means whereby, the operation of said modulator at a predetermined output voltage level is substantially identical for each conductive interval of said inverter.

* * * * *